April 20, 1954   D. B. FERGUSON   2,675,975
SPINNING REEL
Filed Aug. 17, 1953   2 Sheets-Sheet 1
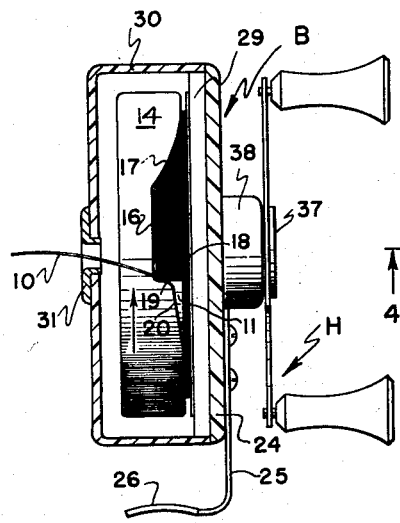
Fig. 1
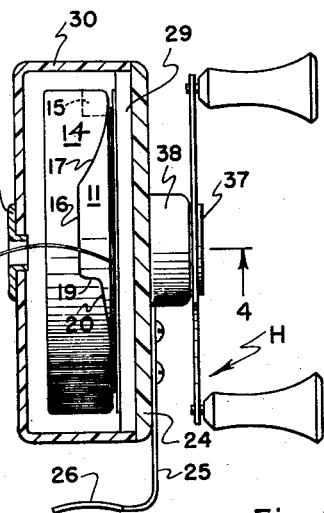
Fig. 2
Fig. 3
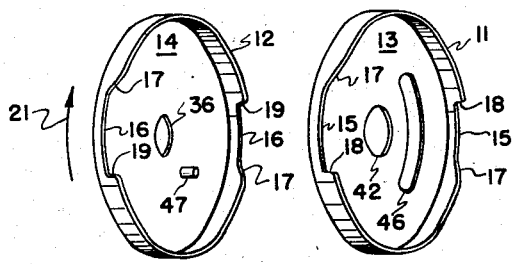
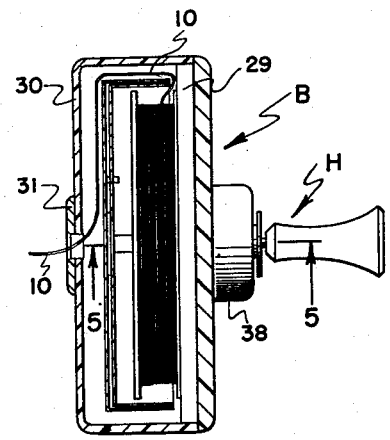
Fig. 4
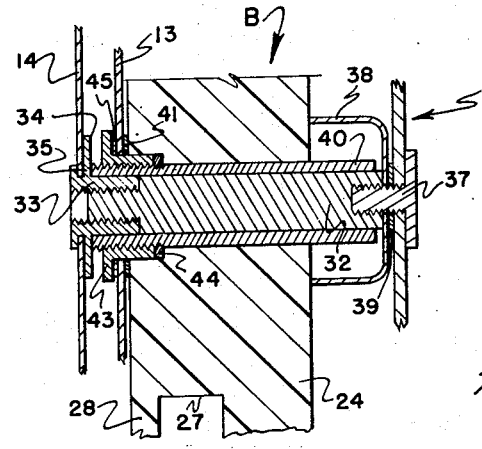
Fig. 5
INVENTOR.
Daniel B. Ferguson
BY
*Horace B. Van Valkenburgh*
ATTORNEY April 20, 1954  D. B. FERGUSON  2,675,975
SPINNING REEL Filed Aug. 17, 1953  2 Sheets-Sheet 2

INVENTOR.
Daniel B. Ferguson
BY
ATTORNEY

Patented Apr. 20, 1954

2,675,975

UNITED STATES PATENT OFFICE 2,675,975

SPINNING REEL

Daniel B. Ferguson, Denver, Colo.

Application August 17, 1953, Serial No. 374,573

14 Claims. (Cl. 242—84.1)

This invention relates to casting reels, utilized primarily for fishing purposes, and more particularly to casting reels of the "spinning" type, in which the fishing line passes axially off the end of a spool during casting.

An earlier casting reel of the spinning type consists of a spool mounted with its axis parallel to the axis of the rod on which the spool is mounted, and during casting, the line, which is wound on the spool, passes off the end of the spool toward the tip of the rod. When the line is to be wound in, a pickup arm or finger, which is placed in a non-interfering position during casting, is swung back into winding position, and forces the line to travel around onto the spool as the arm rotates. Such a spool is, of course, stationary at all times, but the rotating arm tends to foul the line and also may be in various positions when the fisherman wishes to start winding in. Thus, it is often necessary to search for the arm, which sometimes delays the start of the winding operation sufficiently so that the fish may be lost.

In another type of reel, a rotatable, reversely curved winding plate having a scalloped rear edge, i. e., provided with indentations, is disposed at one end of a spool and is moved inwardly for winding and outwardly for unwinding. The plate is rotated for winding, the line catching in one of the indentations, but the necessity for moving axially a plate which is also rotated, unduly complicates the mechanism for actuating the plate. Also, the indentations in the rear edge of the plate tend to interfere with the line during unwinding or casting.

In other casting reels of the spinning type, a "flier" or plate having a flange which extends rearwardly past the front edge of the spool is rotated during winding, and a cam mechanism attached to the handle shaft moves a finger or pin inwardly and outwardly in a radial direction. The spool is stationary and when the handle is turned in one direction, the pin is retracted, but when the handle is turned in the opposite direction, the pin is extended and also the flier rotated. When moved outwardly or extended, the pin extends into the space between the flier flange and the housing and thereby engages the line to wind it onto the spool. This form requires mechanism which may not always be reliable, since the fit of the parts is such that a slight amount of wear or slightly improper adjustment may cause difficulties in operation. Also, difficulties in operation are produced when the pin is not completely retracted, and casting is attempted. In a somewhat similar form of spinning reel, the spool is rotated and a finger is moved by a thumb piece, on the outside of the housing, from a position rearwardly of the spool to a position extending axially across the spool flanges so that when the spool is rotated, the line will be forced to engage the finger and be wound on the spool. This form is not completely satisfactory, since the finger may jam or foul the line.

Among the objects of the present invention are to provide a novel casting reel of the spinning type; to provide such a reel in which the line readily passes off the spool, yet is quickly and accurately engaged for winding when the operating parts are moved to winding position; to provide such a reel in which a flier or the like is utilized for winding the line onto the spool, yet relative axial movement between the flier and the spool is unnecessary; to provide such a reel in which the operating parts do not interfere unduly with free passage of the line off the spool during casting; to provide such a reel in which a simple movement of a handle quickly and readily shifts the parts from winding to unwinding position, and vice versa; to provide such a reel in which the operating parts are readily manufactured and easily assembled; to provide such a reel in which the operating parts do not tend readily to get out of adjustment; and to provide such a reel in which even considerable wear of the operating parts does not materially affect the operation of the reel.

Additional objects and the novel features of this invention will become apparent from the description which follows, taken in connection with the accompanying drawing, in which:

Fig. 1 is a side elevation of a reel constructed in accordance with this invention, with the operating parts in winding position;

Fig. 2 is a similar side elevation, but with the operating parts in unwinding or casting position;

Fig. 3 is an exploded perspective view of a pair of interfitting, cooperating flanged discs which form novel operating parts of the reel;

Fig. 4 is a top plan view of the reel with certain parts in section taken along line 4—4 of Fig. 2;

Fig. 5 is an enlarged, fragmentary axial section taken along line 5—5 of Fig. 4;

Figure 6:
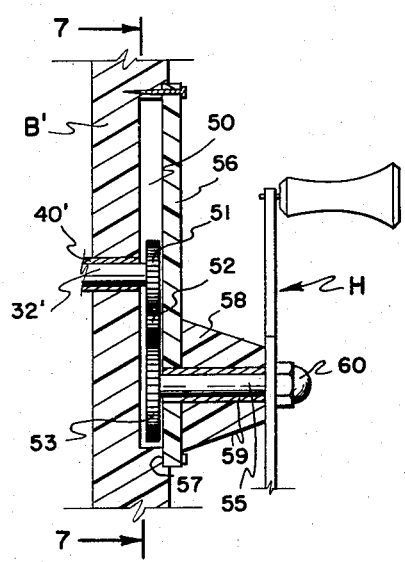
Fig. 6 is a fragmentary oblique section, taken at a slight angle to the vertical, such as along line 6—6 of Fig. 7, illustrating a step-up gear drive which may be installed at one side of a reel of the type illustrated in Figs. 1 and 2.
Figure 7:
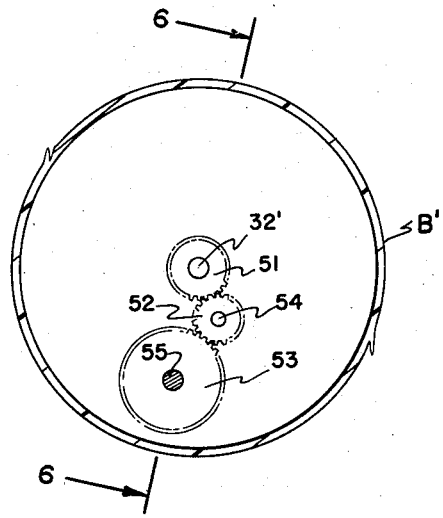
Fig. 7 is a fragmentary, transverse cross section taken along line 7—7 of Fig. 6.
Figure 8:
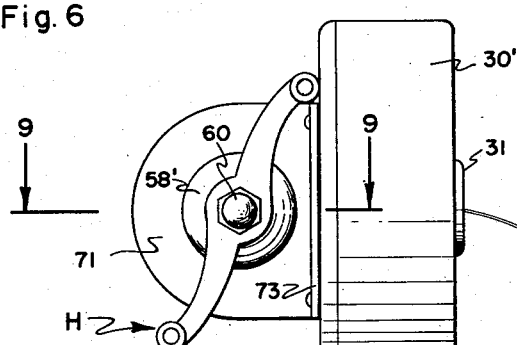
Fig. 8 is a side elevation of a reel forming another embodiment of this invention and installed on a fishing rod, in which step-up gearing of the bevel type is provided so that the axis of the reel handle may extend perpendicularly to the axis of the spool.
Figure 9:
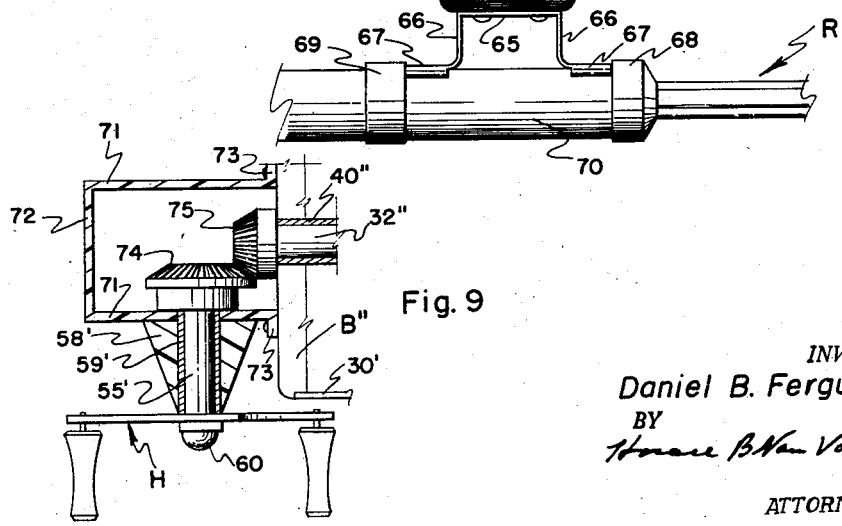
Fig. 9 is a fragmentary, horizontal section, taken along line 9—9 of Fig. 8.

As will be evident from the description which follows, the principles of this invention may be applied to various forms of reels of the spinning type, such as a form in which the reel is mounted with its axis extending transversely to the axis of the rod, so that the line 10 is discharged from and also drawn into the reel from the side, as in the form in which the handle H drives the reel directly and illustrated in Figs. 1 and 2, and the form in which the handle H drives the step-up gearing and illustrated in Figs. 6 and 7. The principles of this invention may also be applied to a form adapted to be mounted on a rod with the axis of the reel extending in the same longitudinal direction as the rod, so that the line 10 is discharged from and drawn into the reel from the front, as illustrated in Figs. 8 and 9, and in which the handle H of the reel is disposed at the side, for readier access by the user.

Thus, as illustrated in the drawing, and particularly Figs. 1, 2 and 4, a casting reel of the spinning type, constructed in accordance with this invention, may include a spool on which the fishing line 10 may be wound, and a pair of rims or flanges 11 and 12, such as formed by a rearwardly extending flange 11 of an inner plate 13 and a rearwardly extending flange 12 of an outer plate 14, respectively, as in Fig. 3. As in Figs. 1 and 2, the inner flange 11 preferably substantially encloses, and at least partially encloses, the spool, while the outer flange 12 preferably completely, and at least substantially, encloses the inner flange 11. Each of the flanges 11 and 12 is provided with one or more slots, such as two slots 15 and 16, respectively, as in Fig. 3, the slots 15 and 16 extending forwardly from the rear edge of the respective flanges and being substantially similar in shape and extent. When two or more slots are present, as shown, the slots 15 and 16 are disposed at corresponding positions on the respective flanges and preferably at equally spaced positions around the periphery of the flange. The slots 15 and 16 are preferably each provided with an inclined leading edge 17, extending at a suitable angle such as 25° to 30°, and also with a substantially radially extending trailing edge 18 and 19, respectively. The trailing edge 18 of each slot 15 may have a comparatively sharp corner, but the trailing edge 19 of each slot 16 preferably terminating at an inclined edge 20, as in Fig. 1. In addition, the corner of trailing edge 19 and inclined edge 20 is preferably rounded and also beveled on the outside, the bevel being continued back along edge 20, so that the line will slide smoothly thereover and there will be no tendency for the line to catch on any sharp corners. Also, the rear edge of flanges 11 and 12 are preferably rounded, to prevent the line being cut or frayed as it moves thereover.

The flanges 11 and 12 are moved relative to each other, as by mechanism or means described hereinafter, between two positions; in one position, as in Fig. 1, the slots 15 and 16 coincide, and in the other position, as in Fig. 2, a solid portion of flange 12 covers each inner slot 15 and a solid portion of flange 11 fills or closes the space beneath each slot 16. As will be evident, when the flanges 11 and 12 are in the position of Fig. 1, with slots 15 and 16 coinciding, and the flanges 11 and 12 are rotated in the direction of arrow 21 by a handle H, the trailing edges of the slots 15 and 16 will engage the line 10 and wind it onto the spool. However, when the flanges 11 and 12 are moved to the position of Fig. 2, the line 10 may pass freely off the spool, in a direction generally axially of the spool. As indicated previously, the bevel at and adjacent the corner between edges 19 and 20 prevents interference with the line during such movement; also, the slanting leading edges 17 of the slots prevents the line from catching on the slots when the flanges are moved from the position of Fig. 2 to the position of Fig. 1. Movement of the flanges between the relative positions of Figs. 1 and 2 is preferably accomplished by turning the handle H in an appropriate direction, as described below.

The spool and rims, or flanges 11 and 12, may be mounted in any suitable manner in or on the reel, which may include a base B having a rear flange 24 attached, as by screws, to a bracket 25 which is provided at its opposite end with a curved bar 26, which may be formed integrally therewith and which is adapted to be attached to the fishing rod, in a conventional manner. The rear flange of the base B may form one flange of the spool, the spool conveniently being formed integrally with the base B. That is, as shown in Fig. 5, the body 27 and front flange 28 of the spool may be formed integrally with the remainder of the base, the flange 28 having a lesser diameter than the rear flange. The rear flange 24 of the base may also be provided with a peripheral groove 29 for reception of a generally cylindrical housing 30, having a closed front in which an eyelet 31, through which the line 10 passes, may be mounted in a central position. The base B and the housing 30 may be formed of plastic, and the eyelet 31 may be made of metal, to prevent the line from cutting into the plastic during passage to the spool.

The outer plate 14, as in Fig. 5, may be attached to a shaft 32, as by a threaded ferrule 33 having a rear flange 34 and a front flange 35 which may be peened or riveted over onto the plate 14. The ferrule 33 extends through a central hole 36 in plate 14, shown in Fig. 3, although the plate may be solid at the center and the ferrule attached thereto by spot welding or any other suitable manner. The handle H is attached to the opposite end of shaft 32, as by a screw 37, the handle preferably being spaced from the rear of the base B by a bell-shaped thimble 38, and a washer 39, to permit easier rotation of the handle, is placed between the handle and the thimble. The shaft 32 rotates in a bushing 40, which extends through a hole drilled, molded or otherwise suitably formed, centrally in the base. The inner plate 13 is comparatively free to rotate with respect to the spool, but is preferably provided with some sort of braking device, such as a friction washer 41 which is disposed between the plate 13 and the front end of the base or spool. The plate 13, as in Fig. 3, is provided with a central hole 42 to accommodate a flanged ferrule 43 of Fig. 5, which may be screwed onto the bushing 40, as in Fig. 5, the ferrule 43 being threaded on the inside and the bushing 40 on the outside. Or, the bushing 40 may be unthreaded and the ferrule 43 threaded on the outside and the central hole in the base and spool provided with cooperating threads, such as around the periphery of an enlargement 44 of the hole through the base which in the embodiment shown accommodates the ferrule 43. Bushing 40 for shaft 32 preferably extends slightly beyond ferrule 43, to prevent plate 14 or flange 34 of ferrule 33 from tending to unscrew ferrule 43. A slightly cupped, spring washer 45 may be placed between plate 13 and the flange of ferrule 43, to regulate the pressure and also prevent plate 13 from unscrewing ferrule 43. As will be evident, only slight pressure need be exerted by ferrule 43 to produce sufficient friction between washer 41 and the front end of the base and spool, particularly when the base and spool are made of plastic, to provide sufficient braking effect on the plate 13. As will also be evident, this clamping pressure is not critical, and the braking effect is also advantageous in playing a fish.

As indicated previously, changes in the relative positions of the flanges 11 and 12, i. e., between the positions of Fig. 1 and Fig. 2, is preferably accomplished merely by movement of the handle H. For this purpose, a lost motion connection between the plates may be utilized, such as by the inner plate 13 being provided with an arcuate slot 46 extending for a greater number of degrees than the flange slots 15 and 16, and the outer plate 14 being provided with an inwardly and axially extending pin 47, adapted to engage the slot 46. Pin 47 may be riveted or otherwise suitably attached to plate 14, as by spot welding. One end of the slot 46 corresponds to a position in which the flange slots 15 and 16 will register, as in Fig. 1, while the opposite end of slot 46 corresponds to the position in which the slot 15 will be covered by a solid portion of flange 12 and the slot 16 will be closed by a solid portion of flange 11, as in Fig. 2. Thus, when the handle H is turned to rotate shaft 32 and plate 14 along with it, in the direction of arrow 21 of Fig. 1 and Fig. 3, the pin 47 will move to the corresponding end of slot 46, if not already there, and the flange slots 15 and 16 will register, so that the line 10 may be picked up by the trailing edges of the slots and wound onto the spool. When the handle H is turned in the opposite direction, the plate 14 will be moved in the direction opposite to the arrow 21 of Fig. 3, the pin 47 will move to the opposite end of slot 46, and the flanges 11 and 12 and slots 15 and 16 will assume the positions shown in Fig. 2. During movement of pin 47 from one end to the other of slot 46, the plate 13 will be restrained from movement by the friction produced by washer 41. Thus, the movement of handle H, in the direction for winding, will automatically move the flanges 11 and 12 to the slot registering or winding position of Fig. 1, while movement of handle H in the opposite direction will automatically move the flanges 11 and 12 to the casting position of Fig. 2. In the latter position, the line will readily pass around the flanges and out through the eyelet 31, since a complete circle is formed by the rear edges of the flanges 11 and 12 when in this position.

If the reel is to be provided with step-up gearing so that the inner plate 13 and outer plate 14 will rotate at a greater speed, than the handle H, such as twice the handle speed, either the form illustrated in Figs. 6 and 7, or that illustrated in Figs. 8 and 9, may be utilized. As indicated previously, in the form illustrated in Figs. 6 and 7, the axis of rotation of the handle H is parallel to the axis of rotation of the plates 13 and 14, so that the reel is mounted with its axis extending transversely to the rod and the line is discharged from and drawn into the reel from the side. In the embodiment of Figs. 6 and 7, the interior parts of the reel may be identical with the interior parts of the form first described, a base B' may be similar to base B of Figs. 1, 2 and 4, except for a circular groove 50 in the rear end thereof, which provides a space to accommodate a pinion 51, an idler pinion 52, and a gear 53. The diameter and number of teeth of the pinions 51 and 52 and the gear 53 are preferably chosen so that the desired speed ratio between the rotation of handle H and shaft 32' will be secured. For instance, the pinion 51 may have 22 teeth, the idler pinion 52 may have 54 teeth and the gear 53 may have 45 teeth, thus producing a speed ratio of approximately 2:1. Pinion 51 is mounted on the rear end of shaft 32', which may be otherwise identical with shaft 32 of the first embodiment described, and shaft 32' may rotate in a bushing 40', which may be identical to the bushing 40 except that it extends only to the circular groove 50. Idler pinion 52 may be mounted on an idler shaft 54 and gear 53 attached to a handle shaft 55, shafts 54 and 55 being supported by a cap 56 which encloses the space formed by groove 50 and may be attached to the base B' in a suitable manner, as by screws, as shown, with a ledge 57 preferably formed around the periphery of groove 50, to position cap 56 more accurately. Cap 56 may be made of a suitable material, such as plastic, and idler shaft 54 may be embedded in the plastic when formed, or pressed into a suitable hole therein. The handle H may be spaced from cap 56 by a conical thimble 58, which may be made of plastic and cemented to or formed integrally with cap 56, while a bushing 59, in which handle shaft 55 rotates, may be pressed into a suitable hole formed in cap 56 and thimble 58. Handle H may be attached to shaft 55 in a suitable manner, as by a nut 60. As will be evident, when the handle H is rotated, the shaft 32' will be rotated at twice the speed of the handle, or at any other speed the ratio for which is provided by the gear and pinions. It will be noted that the idler pinion 52 causes the shaft 32' to be rotated in the same direction as the handle H, but if the direction of rotation of the shaft 32' is immaterial, then the idler pinion 52 may be eliminated and gear 53 engage pinion 51 directly.

There is an advantage in having the axis of the spool and reel extend in the same direction as that of the rod, since a longer cast can often be made, due to the fact that the line passes off the spool and out of the reel in the same direction, or general direction, as it passes up the rod and to the point of cast. If a reel of this form is desired, a construction such as illustrated in Figs. 8 and 9 be utilized, the inerior parts thereof preferably being substantially identical with the interior parts of the reel of Figs. 1 and 2, a base B'' may be substantially identical to the base B of Figs. 1 and 2, except that it is not provided with a mounting bracket for the reel, and the housing 30' may be approximately cylindrical, as before, with the eyelet 31, through which the line 10 moves, facing down the rod R. A bracket 65 having legs 66 may be attached to the housing 30' in a suitable manner, as by rivets, each of the legs 66 having an arcuate, transversely extending flange 67, one of which may be slipped under a fixed ring 68 and the other of which under a movable ring 69, mounted on a reel receiving section 70 of a rod R, so that the axis of the reel will extend in the longitudinal direction of the rod R.

To permit the reel to be wound from the side, the handle H may be mounted for rotation about an axis perpendicular to the axis of the longitudinal axis of the spool and reel, such as by being mounted on a handle shaft 55', as by nut 60, with shaft 55' rotating in a bushing 59' extending through a thimble 58'. Thimble 58' may be attached to one of the flat sides 71 of an auxiliary housing having a generally semicylindrical rear 72, preferably formed integrally with the flat sides 71, the auxiliary housing being attached to base B'', as by screws or the like engaging a flange 73 extending at each side along the front edge of each flat side 71. Within the auxiliary housing, a bevel gear 74 is mounted on the end of shaft 55' opposite handle H, while a bevel pinion 75, in engagement with bevel gear 74, is mounted on the rear end of shaft 32'', which rotates in a bushing 40'' and shaft 32'' and bushing 40'' being otherwise respectively identical with shaft 32 and bushing 40 of Figs. 1 and 2. The number of teeth of bevel gear 74 are proportioned to the number of teeth of bevel pinion 75, so that the desired speed ratio will be obtained.

From the foregoing, it will be evident that the casting reel of this invention fulfills to a marked degree the requirements and objects hereinbefore set forth. As will be evident, the line readily passes off the spool, but is quickly and accurately engaged for winding merely by turning the handle in the desired direction for winding. While the flanges 11 and 12 may be considered as fliers, and are utilized for winding the line onto the spool, no axial relative movement between the two is necessary for changing from winding to unwinding position, and vice versa. Particularly when the trailing edge 19 of the slot 16 of the outer flange 12 does not extend clear to the rear edge of the flange, as when the inclined edge 20 is provided, and also when the corner between edges 19 and 20 is beveled off, as indicated, the flanges 11 and 12 do not interfere with free passage of the line off the spool during casting. The various parts are readily and easily manufactured, the parts preferably made of plastic, such as the base B, B' or B'' and the housing 30 or 30', as well as the auxiliary housing having flat sides 71, conveniently being molded, while the remaining parts may be made of metal, the plates 13 and 14 being easily formed by spinning or stamping, while the various holes and slots therein may be formed readily by punching or stamping. The shaft 32, 32' or 32'', shaft 54, handle shaft 55 or 55', ferrules 33 and 43, as well as bushing 40, 40', 40'', 59 or 59', are readily formed as screw machine products, while the screw 37 and washers 39 and 41, as well as gear 53, pinions 51 and 52, bevel gear 74 and bevel pinion 75, may be standard parts. The reel is readily and conveniently assembled, since no complicated assembly operations are involved and about the only real care that must be taken is to insure that pin 47 fits into slot 46 when the plate 40 is attached to the shaft, although the plate 40 may be attached to the shaft prior to attachment of the handle H or gears 51 or 75 to the opposite end thereof, and the shaft and plate 14 slipped into position, with the pin 47 in slot 46. As will be further evident, wear on the operating parts does not materially affect the operation of the reel, since wear of pin 47 or the ends of slot 46 merely causes the flanges 11 and 12 to be moved slightly beyond the previous positions. Movement slightly beyond the position of Fig. 2 does not affect the casting operation thereof, since the inner slots 15 will still be covered by the flange 12 and the slot 16 will be closed by solid portions of the flange 11, while a slight misalignment in either direction of the trailing edges 18 and 19 of the slots does not affect the line being picked up, since either trailing edge will pick up the line and wind it on the spool. The spool illustrated has a relatively narrow and comparatively deep space for reception of the line, and this construction is preferable, since the necessity for axial reciprocation of any part to wind the line evenly on the spool is thereby avoided. When the housing 30 or 30' and base B, B' or B'' are made of clear plastic, the winding and unwinding operations can be observed by the user, which adds to the sales appeal of the product.

Although specific embodiments of this invention have been illustrated and described with particularity, it will be evident that numerous variations may be made therein, in addition to those indicated. Thus, suitable materials other than those described may be utilized, while the sizes of the various parts may be changed. The handle may be attached to its shaft in a different manner, while the housing may be provided with a conical front end. Furthermore, the size and shape of the slots 15 and 16 may be varied considerably and other constructions for rotating the plate 14 and mounting the plates 13 and 14 may be utilized. Furthermore, the spool may be rotated rather than the flanges while other means, such as spiders or the like, may be utilized for supporting the flanges 11 and 12 in the desired position.

It will further be understood that other embodiments may exist and additional variations may be made, all without departing from the spirit and scope of this invention.

What is claimed is:

1. A casting reel comprising a spool on which a fishing line may be wound; an inner plate coaxial with and forwardly of said spool and having a radial flange extending rearwardly from said plate, and at least partially enclosing said spool, said flange having at least one slot therein extending forwardly from the rear edge thereof; an outer plate coaxial with and forwardly of said spool and said inner plate, and having a radial flange extending rearwardly and at least substantially enclosing said flange of said inner plate, said flange of said outer plate having at least one slot therein extending forwardly from the rear edge thereof, at least one said slot of said flanges having a trailing edge adapted to engage a fishing line and wind the same onto said spool upon rotation of said flange; means for rotating said plates, and said flanges therewith, for winding a line onto said spool; and means for moving said plates between two relative radial positions, in one position said slots substantially coinciding so that the said trailing edge may engage said line to wind the same on said spool, and in the other position, a solid portion of said outer flange covering each slot of said inner flange and each slot of said outer flange being closed by a solid portion of said inner flange, so that the line may pass off said spool around said flanges.

2. A casting reel as defined in claim 1, wherein said means for rotating said plates includes means for rotating one said plate and a lost-motion connection between said plates.

3. A casting reel as defined in claim 2, wherein said lost-motion connection between said plates comprises an arcuate slot in one plate and a pin attached to the other plate and extending into said slot, said rotating means being connected to said plate to which said pin is attached.

4. A casting reel as defined in claim 3, including a braking device for said plate having said slot.

5. A casting reel as defined in claim 4, wherein said inner plate is provided with said slot, and said braking device includes a washer between said inner plate and the end of said spool.

6. A casting reel comprising a spool on which a fishing line may be wound; said spool having a space for reception of said line which is relatively narrow in the axial direction; an inner plate coaxial with and forwardly of said spool and having a radial flange extending rearwardly from and perpendicularly to said plate and substantially enclosing said spool, said flange having at least one slot therein extending forwardly from the rear edge thereof; an outer plate coaxial with and forwardly of said spool and said inner plate, and having a perpendicular, radial flange extending rearwardly and at least substantially completely enclosing said flange of said inner plate, said flange of said outer plate having at least one slot therein extending forwardly from the rear edge thereof, each said slot of said flanges having a trailing edge adapted to engage a fishing line and wind the same onto said spool upon rotation of said flange; means for rotating said plates and said flanges therewith for winding a line onto said spool; and means for moving said plates between two relative radial positions, in one position said slots substantially coinciding so that the said trailing edge may engage said line to wind the same on said spool, and in the other position, a solid portion of said outer flange covering each slot of said inner flange and a solid portion of said inner flange closing each slot of said outer flange, so that the line may pass off said spool around said flanges.

7. A casting reel comprising a spool on which a fishing line may be wound; means including an inner cylindrical rim coaxial with and at least partially enclosing said spool, said rim having at least one slot therein extending forwardly from the rear edge thereof; means including an outer cylindrical rim coaxial with and at least substantially enclosing said inner rim, said outer rim having at least one slot therein extending forwardly from the rear edge thereof, at least one said slot of said rims having a trailing edge adapted to engage a fishing line and wind the same onto said spool upon rotation of said rims; means for effecting a relative rotation between said spool and said rims for winding a line onto said spool; and means for moving said rims between two relative radial positions, in one position said slots substantially coinciding so that the said trailing edge may enage said line to wind the same on said spool, and in the other position, a solid portion of said outer rim covering each slot of said inner rim and a solid portion of said inner rim closing each slot in said outer rim, so that the line may pass off said spool around said rims.

8. A casting reel as defined in claim 7, wherein said rim slots are substantially coextensive, each said slot having a central portion substantially parallel to the rear edge of said rim, an inclined leading edge and a generally radial trailing edge, said outer rim slots also having an inclined trailing edge adjacent said radial trailing edge with the corner between the same being rounded and beveled on the outside.

9. A casting reel, adapted to be mounted on a fishing rod, comprising a base having a rear flange and a front flange to form a spool therebetween on which a fishing line may be wound, said front flange having a lesser diameter than said rear flange; a cylindrical housing having a closed front provided with a central opening for said line and mounted on said base to enclose the spool portion thereof, said base having a hole extending axially therethrough; a shaft mounted in said hole; a handle operatively connected with said shaft; an inner plate coaxial with and forwardly of said spool and having a radial flange extending rearwardly from said plate and substantially enclosing said spool, said flange having at least one slot therein extending forwardly from the rear edge thereof; a braking device for said inner plate; an outer plate coaxial with and forwardly of said spool and said inner plate, and having a depending flange extending rearwardly and at least substantially enclosing said flange of said inner plate, said flange of said outer plate having at least one slot therein extending forwardly from the rear edge thereof, said slots of said flanges having a trailing edge adapted to engage a fishing line and wind the same onto said spool upon rotation of said flange and an inclined leading edge; means connecting said outer plate to said shaft for rotation of said plates to wind a line onto said spool; and a lost-motion connection between said plates for moving said plates between two relative positions, in one position said slots substantially coinciding so that the said trailing edge may engage said line to wind the same on said spool, and in the other position, a solid portion of said outer flange covering each slot of said inner flange and a solid portion of said inner flange closing each slot of said outer flange, so that the line may pass off said spool around said flanges.

10. In a casting reel as defined in claim 9, wherein said base is provided with a groove for receiving a pinion mounted on said shaft, and at least one gear or pinion in engagement with said shaft pinion; a cap covers said groove; a handle shaft is mounted on said cap; a handle is attached to the extending end of said handle shaft; and said gear is mounted on said handle shaft on the opposite side of said cap.

11. In a casting reel as defined in claim 10, wherein said base is provided with a ledge around said groove to receive said cap; an idler pinion is rotatable on a shaft mounted on said cap, said idler pinion engaging said shaft pinions and said gear; said handle is spaced from said cap by a thimble attached to said cap; and said handle shaft is journaled in a bushing extending through said thimble and said cap.

12. In a casting reel as defined in claim 9, wherein a bevel pinion is mounted on said shaft; and said handle is mounted for rotation about an axis perpendicular to said shaft and rotates a bevel gear in engagement with said bevel pinion.

13. In a casting reel as defined in claim 12, wherein said handle is mounted on a handle shaft on the inner end of which said bevel gear is mounted; and an auxiliary housing mounted on said base encloses said bevel gear and pinion and provides a support for said handle shaft.

14. A casting reel adapted to be mounted on a fishing rod, comprising a base formed of plastic and having a rear flange and a front flange to form a spool therebetween on which a fishing line may be wound, said front flange having a lesser diameter than said rear flange and said rear flange having a circumferential groove; a cylindrical housing having a closed front provided with a central opening for said line and engageable with said groove of said base to enclose the spool portion thereof, said base having a hole extending axially therethrough; a bushing mounted in said hole; a shaft mounted for rotation in said bushing; a handle operatively connected with said shaft; an inner plate coaxial with and forwardly of said spool and having a radial flange extending rearwardly from said plate and substantially enclosing said spool, said flange having at least two spaced slots therein extending forwardly from the rear edge thereof and each said slot having an inclined leading edge and an axially extending trailing edge, said inner plate having a circumferentially extending slot spaced inwardly from said flange; a braking washer between said inner plate and said base; a ferrule threadedly engaging said bushing and pressing said inner plate against said washer; an outer plate coaxial with and forwardly of said spool and said inner plate, said outer plate having a radial flange extending rearwardly and enclosing said flange of said inner plate, said flange of said outer plate having at least two spaced slots therein extending forwardly from the rear edge theerof, each said slot of said outer plate flange having an inclined leading edge and an axially extending trailing edge adapted to engage a fishing line and wind the same onto said spool upon rotation of said flange, said outer plate flange having an inclined edge extending to said trailing edge with a rounded corner therebetween; a ferrule threadedly engaging the forward end of said shaft and attaching said outer plate to said shaft; and a pin mounted on said outer plate and extending rearwardly into said slot in said inner plate for rotation of said plates to wind a line onto said spool, said pin and slot forming a lost-motion connection between said plates for moving said plates between two relative positions, in one position said slots coinciding so that a trailing edge may engage said line to wind the same on said spool, and in the other position, a solid portion of said outer flange covering each slot of said inner flange and a solid portion of said inner flange closing each slot in said outer flange, so that the line may pass off said spool around said flanges.

References Cited in the file of this patent

UNITED STATES PATENTS

| Number | Name | Date |
|---|---|---|
| 1,187,840 | Illingworth | June 20, 1916 |
| 2,492,587 | Ledingham | Dec. 27, 1949 |
| 2,507,457 | Rix | May 9, 1950 |
| 2,521,543 | Shakespeare et al. | Sept. 5, 1950 |
| 2,600,558 | Mauborgne | June 17, 1952 |
| 2,630,979 | Uerling | Mar. 10, 1953 |